United States Patent
Bool, III et al.

(10) Patent No.: US 6,562,104 B2
(45) Date of Patent: May 13, 2003

(54) METHOD AND SYSTEM FOR COMBUSTING A FUEL

(75) Inventors: Lawrence E. Bool, III, Hopewell Junction, NY (US); Hisashi Kobayashi, Putnam Valley, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/810,449

(22) Filed: Mar. 19, 2001

(65) Prior Publication Data

US 2002/0073844 A1 Jun. 20, 2002

Related U.S. Application Data

(63) Continuation-in-part of application No. 09/739,278, filed on Dec. 19, 2000, now abandoned.

(51) Int. Cl.$^7$ ................................................ B01D 53/22
(52) U.S. Cl. ............................. 95/54; 96/4; 96/8; 96/9; 96/10
(58) Field of Search ................................. 95/39, 45, 54, 95/288; 96/4, 8, 10

(56) References Cited

U.S. PATENT DOCUMENTS

| | | | | |
|---|---|---|---|---|
| 5,160,713 A | * | 11/1992 | Mazanec et al. | 95/54 X |
| 5,516,359 A | * | 5/1996 | Kang et al. | 95/54 X |
| 5,562,754 A | | 10/1996 | Kang et al. | 95/54 |
| 5,565,017 A | * | 10/1996 | Kang et al. | 95/54 X |
| 5,820,654 A | * | 10/1998 | Gottzman et al. | 95/54 |
| 5,852,925 A | * | 12/1998 | Prasad et al. | 95/45 X |
| 5,888,272 A | | 3/1999 | Prasad et al. | 95/54 |
| 5,964,922 A | | 10/1999 | Keskar et al. | 95/39 |
| 6,010,614 A | * | 1/2000 | Keskar et al. | 95/54 X |
| 6,077,323 A | * | 6/2000 | Nataraj et al. | 95/54 X |
| 6,106,591 A | * | 8/2000 | Keskar et al. | 95/54 |
| 6,114,400 A | * | 9/2000 | Nataraj et al. | 95/54 X |
| 6,117,210 A | * | 9/2000 | Prasad et al. | 95/54 |
| 6,139,604 A | * | 10/2000 | Gottzmann et al. | 95/54 |
| 6,139,810 A | * | 10/2000 | Gottzmann et al. | 96/8 X |
| 6,149,714 A | * | 11/2000 | Kobayashi | 95/54 |
| 6,296,686 B1 | * | 10/2001 | Prasad et al. | 95/45 X |
| 6,309,612 B1 | * | 10/2001 | Balachandran et al. | 95/54 X |

* cited by examiner

Primary Examiner—Robert H. Spitzer
(74) Attorney, Agent, or Firm—David M. Rosenblum

(57) ABSTRACT

A method and system is provided for combusting a fuel having application to a heat consuming device such as a boiler or furnace or a reactor. An oxygen-containing stream is introduced into one or more oxygen transport membranes subjected to a reactive purge or a sweep gas. The oxygen transport membrane(s) can advantageously be subjected to a reactive purge or a sweep gas passing in a cross-flow direction with respect to the membranes to facilitate separation of the oxygen. In case of a reactive purge, temperature control of the oxygen transport membrane(s) is effectuated by the use of a suitable heat sink. Further, the oxygen transport membranes can be arranged in a row and be connected in series such that retentate streams of ever lower oxygen concentrations are passed to successive oxygen transport membranes in the row. The fuel or sweep gas can be introduced in a direction counter-current to the bulk flow of the retentate streams.

22 Claims, 3 Drawing Sheets

METHOD AND SYSTEM FOR COMBUSTING A FUEL

RELATED APPLICATIONS

This is a continuation-in-part of Ser. No. 09/739,278, filed Dec. 19, 2000, now abandoned.

FIELD OF THE INVENTION

The present invention relates to a method and system for combusting fuel that has direct application to heat consuming devices such as boilers and furnaces as well as reactors that utilize separated oxygen. More particularly, the present invention relates to such a combustion method and system in which combustion is enhanced with oxygen produced by the use of a ceramic membrane system. Even more particularly, the present invention relates to such a method and system in which the ceramic membrane system is subjected to a countercurrent reactive purge or flow of sweep gas.

BACKGROUND OF THE INVENTION

Growing concerns about environmental issues, such as global warming and pollutant emissions, are driving industries to explore new ways to increase efficiency and reduce emissions of pollutants. This is particularly true for fossil fuel fired combustion systems, which represent one of the largest sources of carbon dioxide and air pollution emissions. One effective way to reduce emissions and to increase efficiency is to use oxygen, or oxygen enriched air, in the combustion process. The use of oxygen or oxygen enriched air reduces stack heat losses, which increases the system efficiency, while at the same time reducing NOx emissions. Further, the concentration of carbon dioxide in the flue gas is higher since there is little or no nitrogen to act as a diluent. The higher carbon dioxide concentration enhances carbon dioxide recovery options.

Oxygen using the prior art has been limited to those processes with high exhaust temperatures, such as glass furnaces. In such applications, the fuel savings and other benefits achieved are greater than the cost of the oxygen. In low exhaust temperature systems, such as boilers, the reverse is true. In these systems, the cost of oxygen produced with current technologies is more expensive than the available fuel savings. This makes oxygen use in such systems economically unattractive. Moreover, when the energy required to produce the oxygen is taken into consideration, the overall thermal efficiency decreases.

Oxygen transport membranes have been advantageously utilized in the prior art to produce oxygen for heat consuming devices and processes in a manner that results in a savings of energy that would otherwise have to be expended in the separation of oxygen. Oxygen transport membranes are fabricated from oxygen-selective, ion transport ceramics in the form of tubes or plates that are in themselves impervious to the flow of oxygen. Such ceramics, however, exhibit infinite oxygen selectivity at high temperatures by transporting oxygen ions through the membrane. In oxygen transport membranes, the oxygen is ionized on one surface of the membrane to form oxygen ions that are transported through the membrane. The oxygen ions on the opposite side of the membrane recombine to form oxygen with the production of electrons. Depending upon the type of ceramic, oxygen ions either flow through the membrane to ionize the oxygen or along separate electrical pathways within the membrane, or by an applied electric potential. Such solid electrolyte membranes are made from inorganic oxides, typified by calcium- or yttrium-stabilized zirconium and analogous oxides having fluoride or perovskite structures.

In U.S. Pat. No. 5,888,272 oxygen transport membranes are integrated into a combustion process itself, with all the oxygen produced going directly into the combustor. The heated flue gases can then be routed to a heat consuming process. In one embodiment, flue gases are recycled through a bank of oxygen transport membrane tubes and enriched with oxygen. Typically the flue gas enters the bank containing anywhere from 1 to about 3 percent oxygen and leaves the bank containing from about 10 to about 30 percent oxygen by volume. The enriched flue gas is then sent to a combustion space where it is used to burn fuel. In another embodiment, called reactive purge, the oxygen transport membrane tubes are placed directly in the combustion space. A fuel and flue gas mixture, is passed through the tubes and combust with the oxygen as it passes through the tubes. Thus oxygen production and combustion take place simultaneously inside the oxygen transport membrane with the fuel diluted with flue gas.

As will be discussed, the present invention utilizes oxygen transport membranes to produce oxygen to support combustion that inherently reduces the energy expenditures involved in compressing an incoming oxygen containing feed to the membranes. Combustion can take place at the surface of the oxygen transport membranes in the presence of fuel that is not diluted with flue gas.

SUMMARY OF THE INVENTION

The present invention provides methods and systems for combusting fuel that have direct application to such heat consuming devices as boilers and furnaces or to reactors that separate oxygen from an oxygen-containing feed. Such reactors include devices for separating oxygen to produce a nitrogen-enriched product.

In accordance with one method of the present invention, an oxygen-containing stream is introduced into at least one oxygen transport membrane. The membrane projects into a combustion zone to separate oxygen from the oxygen-containing stream and thereby, to introduce an oxygen permeate into the combustion zone. A fuel stream is introduced into the combustion zone and fuel within the fuel stream is combusted in the presence of the oxygen permeate so that the at least one oxygen transport membrane is subjected to a reactive purge and a portion of heat arising from the combustion of the fuel heats the at least one ceramic membrane to an operational temperature. Radiant heat energy emanating from the at least one oxygen transport membrane is absorbed within a heat sink to promote stabilization of the operational temperature of the at least one oxygen transport membrane.

The at least one oxygen transport membrane can comprise at least one row of oxygen transport membranes spaced apart from one another. The fuel stream is introduced in a cross-flow relationship to the at least one row of oxygen transport membranes.

It is to be noted that the term, "cross-flow" as used herein and in the claims means a flow direction with respect to the oxygen transport membranes that is at right angles to the length of the oxygen transport membranes plus or minus about forty-five degrees. For instance, if tubular oxygen transport membranes are used, the "cross-flow" direction would be at or near right angles to the tube as opposed to a direction parallel to the length of the tube as measured between its ends. As such, in "cross-flow" the fuel stream and therefore, the reactive purge, can be directed anywhere from an angle directly in line with the row to a direction at right angles to the row. Furthermore, the term "row" as used herein and the claims means any arrangement of oxygen transport membranes in a single file. The oxygen transport membranes to be in a "row" do not necessarily, however, have to be positioned so that one oxygen transport membrane is directly in front of or behind another oxygen transport membrane. For instance, oxygen transport membranes may be staggered so that each membrane has full benefit of the reactive purge, or as will be discussed, a sweep gas such that each oxygen transport membrane can take full advantage of such a reactive purge or sweep gas acting at least substantially parallel to the line of oxygen transport membranes making up a row.

It should be pointed out that a cross-flow arrangement is advantageous over flow arrangements that act parallel to the length of the oxygen transport membranes. One major advantage is that all adjacent oxygen transport membranes, as viewed in a transverse direction to the reactive purge will see the same combustion conditions. Furthermore, the fuel composition will be substantially the same from the top to the bottom of an oxygen transport membrane. This will promote uniformity in the oxygen flux and therefore, the combustion flux for the reactive purge along the length of an oxygen transport membrane. Since, the composition of the surrounding gas will change as one moves from such transverse sets of oxygen transport membranes it is conceivable that different materials could be advantageously used in subsequent sets of oxygen transport membranes. Furthermore, the rows might be designed to provide additional transverse sets of such adjacent oxygen transport membranes that would provide a back-up upon the degradation of a preceding transverse set of oxygen transport membranes.

The heat sink with respect to the at least one row of oxygen transport membranes can comprise tubes of flowing heat absorbing fluid interspersed within the at least one row of oxygen transport membranes. The tubes of flowing heat absorbing fluid can be steam tubes to heat water flowing therein. In such case, the method of the present invention would be applied to a boiler.

The at least one row of oxygen transport membranes can be connected in series to produce a flow path of retentate streams passing to successive oxygen transport membranes having ever more lean oxygen concentrations. The fuel stream can be introduced into the combustion zone in a counter-current flow direction as viewed with respect to the flow path of the retentate streams so that the reactive purge acts in the counter-current flow direction.

In accordance with another method of the present invention, at least one oxygen transport membrane projects into a separation zone to separate oxygen from the oxygen-containing stream and thereby, to introduce the oxygen permeate into the separation zone. The at least one oxygen transport membrane is heated to an operational temperature. A fuel stream is combusted in a combustion zone located within the heat consuming device to produce a flue gas stream. A sweep gas stream composed of part of the flue gas stream is circulated within the separation zone. Further, the sweep gas stream is circulated from the separation zone to the combustion zone to support combustion of the fuel stream.

The at least one oxygen transport membrane can comprise at least one row of oxygen transport membranes spaced apart from one another and the sweep gas stream can be introduced in a cross-flow relationship to the at least one row of oxygen transport membranes. The oxygen transport membranes can be connected in series to produce a flow path of retentate streams passing to successive oxygen transport membranes and having ever more lean oxygen concentrations. In such case, the sweep gas stream can be circulated in a counter-current flow direction as viewed with respect to the flow path of the retentate streams. The oxygen transport membranes can be heated to the operational temperature by the sweep gas stream.

Advantageously, the sweep gas stream can be circulated by cooling a remaining part of the flue gas stream and injecting the remaining part of the flue gas stream into the separation zone in the form of at least one jet. Alternatively, the sweep gas stream can be circulated by cooling the sweep gas stream after passage through the separation zone and injecting the sweep gas stream into the combustion zone by a blower.

The foregoing method could be used to separate oxygen from air. In such case, the oxygen-enriched stream is air and separation of the oxygen from the oxygen-enriched stream produces a nitrogen-enriched stream. The nitrogen enriched stream can be extracted as a product stream.

The present invention also provides oxygen-enhanced combustion systems that again have principal applications to heat consuming devices and various types of reactors. In one such system, at least one oxygen transport membrane is located within a combustion zone to separate oxygen from an oxygen-containing stream introduced into the at least one oxygen transport membrane, thereby to produce an oxygen permeate. At least one fuel nozzle is provided for injecting a fuel stream of the fuel into the combustion zone so that the at least one oxygen transport membrane is subjected to a reactive purge produced by combustion of the fuel in the presence of the permeated oxygen and a portion of heat arising from the combustion of the fuel heats the at least one ceramic membrane to an operational temperature. A heat sink is positioned to absorb radiant heat energy emanating from the at least one oxygen transport membrane to promote stabilization of the operational temperature thereof.

The at least one oxygen transport membrane can comprise at least one row of oxygen transport membranes spaced apart from one another. The heat sink can comprise tubes of flowing heat absorbing fluid interspersed within the at least one row of oxygen transport membranes. The tubes of flowing heat absorbing fluid can be steam tubes to heat water flowing therein. In such case, the heat consuming device to which the present invention would be applied could be a boiler.

The at least one row of oxygen transport membranes can be connected in series to produce a flow path of retentate streams passing to successive oxygen transport membranes having ever more lean oxygen concentrations. The at least one fuel nozzle can be positioned to introduce the fuel stream into the combustion zone in a counter-current flow direction as viewed with respect to the flow path of the retentate streams so that the reactive purge acts in the counter-current flow direction.

In an alternative system in accordance with the present invention, at least one oxygen transport membrane is positioned within a separation zone of the heat consuming device to introduce the permeated oxygen into the separation zone. At least one nozzle is provided for injecting a fuel stream into a combustion zone for combustion of the fuel stream to produce a flue gas stream. A means is provided for heating the at least one oxygen transport membrane to an operational temperature. A means is also provided for circulating a sweep gas stream composed of a part of the flue gas stream into the separation zone and from the separation zone to the combustion zone to support combustion of the fuel stream. As in other embodiments, the at least one oxygen transport membrane can comprise at least one row of oxygen transport membranes spaced apart from one another. The sweep gas circulation means circulate the sweep gas stream in a cross-flow relationship to the at least one row of oxygen transport membranes. The oxygen transport membranes can be connected in series to produce a flow path of retentate streams passing to successive oxygen transport membranes and having ever more lean oxygen concentrations. In such case, the sweep gas stream is circulated in a counter-current flow direction as viewed with respect to the flow path of the retentate streams. The heating means can comprise heat transfer from the sweep gas stream to the oxygen transport membranes. The foregoing aspects of the present invention could be applied to a furnace or a boiler.

The circulation means can include a heat exchanger to cool a remaining part of the flue gas stream. Additionally, at least one flue gas nozzle is provided to inject at least one flue gas jet composed of the flue gas stream into the separation zone and a blower interposed between the heat exchanger and the at least one flue gas nozzle. Alternatively, the circulation means can comprise a heat exchanger to cool the sweep gas stream. The heat exchanger is positioned to receive the sweep gas stream after having passed through the separation zone. An inlet to the combustion zone is provided and a blower is interposed between the heat exchanger and the inlet to inject the sweep gas stream into the combustion zone.

In embodiments of the present invention in which the oxygen transport membranes are connected in series, as retentate streams emanating from the oxygen transport membranes are sequentially introduced into the membranes of the row, the oxygen content of the feed to each membrane decreases and therefore the amount of oxygen permeated through each successive membrane also decreases. Thus, the permeated oxygen in the vicinity of the last of the oxygen transport membranes in the row is at a lower concentration and therefore, a lower oxygen partial pressure than at the first of the oxygen transport membranes in the row. At the same time, the oxygen partial pressure within each of the oxygen transport membranes is also successively decreasing as it passes to successive membranes in a row. If the partial pressure of the permeated oxygen remains constant or in fact decreases in the vicinity of successive membranes, the pressure driving force for effecting the separation in such successive oxygen transport membranes is also decreasing.

As a result of the ever decreasing pressure driving force, in successive oxygen transport membranes, in order to effect the separation at the last oxygen transport membrane in the row, the separation needs more facilitation by the reactive purge or sweep gas than at the first of the oxygen transport membranes. This naturally occurs in the present invention due to the countercurrent flow of the fuel stream that can act as a reactive purge or the sweep gas. In case of a reactive purge provided by the fuel stream, as the fuel flows in the counter-current direction, the fuel is consumed and thus, the concentration of fuel within the bulk flow of fuel and combustion gases decreases. As a result, it becomes increasingly difficult for the fuel to diffuse to the surface of the membrane and combust. Therefore, the reactive purge is most effective at the last of the oxygen transport membranes in the row where the greatest facilitation of oxygen separation by the reactive purge is required. As the flow of fuel containing gases flows along the row, diffusion of the fuel to the surface of the membrane is more difficult due to the dilution of fuel within the combustion gases. However, less facilitation is required due to the increasing pressure driving force in successive oxygen transport membranes towards the first of the oxygen transport membranes.

The action of a counter-current flow of sweep gas has a similar effect to the reactive purge in that as it flows in the counter-current direction, it has the lowest concentration of oxygen at the last of the oxygen transport membranes in the row and therefore is most able to facilitate the separation at such oxygen transport membrane. As it travels in the counter-current direction and gains oxygen, it is least able to facilitate the separation. However, less facilitation is required in successive oxygen transport membranes taken in a direction from the last of the oxygen transport membranes to the first of the oxygen transport membranes.

As may be appreciated, the use of any reactive purge reduces the degree of compression for the incoming feed such that only a blower or an induced draft fan might be necessary to circulate the oxygen-containing gas into the oxygen transport membranes. The use of a counter-current reactive purge or sweep gas, reduces the degree of compression that would otherwise be required to compress the feed to an oxygen transport membrane system. This reduction of compressive effort makes the application of the present invention attractive even in low exhaust temperature systems such as boilers.

In the present invention, the reactive purge involves the combustion of fuel in the presence of oxygen separated by the membrane. As a result, this combustion of oxygen takes place at or near the surface of the membrane to produce a driving force for the separation to also lessen or possibly eliminate the degree to which the incoming oxygen containing feed need be compressed. Hence, the reactive purge of the present invention has application to any membrane system whether or not there are multiple membranes used or multiple membranes are connected in series.

Since, the adiabatic flame temperature of ambient temperature methane and pure oxygen exceeds 5000° F., direct combustion of natural gas on the surface of an oxygen transport membrane is not normally considered. In the prior art, the excessive temperature problem involved in reactive purging is overcome by mixing a small amount of fuel with a large amount of non-reactive purge gas. In many membrane types, the flux of oxygen through the membrane increases as the membrane temperature increases. The combustion reaction at the surface, and therefore the heat release at the surface, is therefore limited by the oxygen flux through the membrane. However, poor temperature control can lead to catastrophic thermal runaway of the membrane. As the temperature increases more oxygen passes through the membrane leading to higher combustion rates at the surface and still higher membrane temperatures until the temperature limitations of the membrane is exceeded. As will be discussed in more detail, the inventors herein have found that temperature control of the membranes can be accomplished by appropriate placement or arrangement of the membranes with respect to a heat sink that can absorb radiant heat and therefore prevent damaging thermal runaway.

BRIEF DESCRIPTION OF THE DRAWINGS

While the specification concludes with claims distinctly pointing out the subject matter that Applicants regard as their invention, it is believed that the invention would be better understood when taken in connection with the accompanied drawings in which:

FIG. 3 is an alternative embodiment of a boiler employing a combustion method and system in accordance with the present invention;

DETAILED DESCRIPTION

Figure 1:
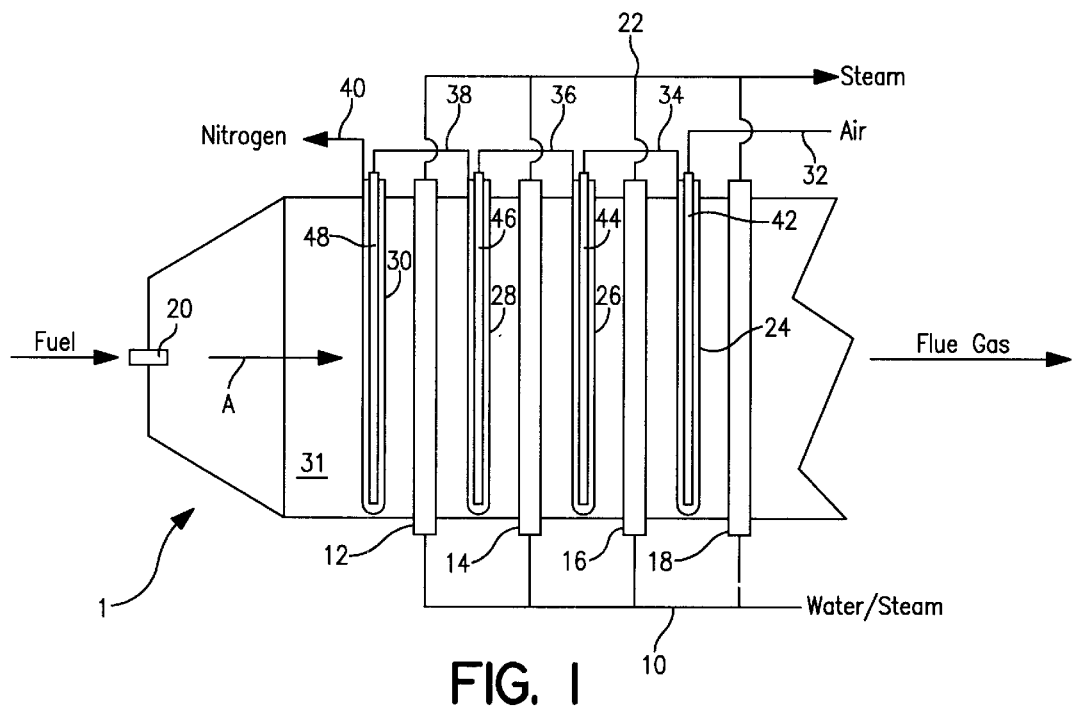
FIG. 1 is a fragmentary view of a boiler employing a combustion method and system in accordance with the present invention.

With reference to FIG. 1 a boiler 1 in accordance with the present invention is illustrated. Boiler 1 heats water or steam that is introduced through an inlet manifold 10 into steam tubes 12, 14, 16 and 18. Either steam or superheated steam is raised within steam tubes 12, 14, 16 and 18 with the combustion of fuel, for instance, methane or natural gas, which enters boiler 1 through a fuel inlet nozzle 20. The steam or superheated steam is discharged through an outlet manifold 22.

A row of oxygen transport membranes 24, 26, 28 and 30 project into a combustion zone 31 provided within boiler 1. Compressed air stream 32 is introduced into a first of the oxygen transport membranes 24. Oxygen permeates through such first oxygen transport membrane 24 to produce a retentate stream 34 that has lower concentration of oxygen than the incoming oxygen-containing stream. Retentate stream 34 is then introduced into a successive oxygen transport membrane 26 where still more oxygen is permeated through the membrane to produce another retentate stream 36 which has a still lower concentration of oxygen than retentate stream 34. Retentate stream 36 is introduced into succeeding oxygen transport membrane 28 in which more oxygen is permeated to produce a retentate stream 38 which contains a still lower concentration of oxygen. Retentate stream 38 is introduced into a last of the oxygen transport membranes 30 in which oxygen further permeates to produce a retentate stream which is very lean in oxygen as compared to the incoming air and thus can be taken as a nitrogen product stream 40.

In order to effectuate the foregoing operation, oxygen transport membranes 24, 26, 28, and 30 are connected in series by an arrangement of lance tubes 42, 44, 46 and 48. Lance tube 42 is connected to a source of the air feed to receive air stream 32. Lance tubes 44, 46, and 48 are connected to the oxygen transport membranes 26, 28, and 30 so that lance tube 44 is fed with retentate produced within oxygen transport membrane 24, lance tube 46 is fed with retentate produced within oxygen transport membrane 26, and lance tube 48 is fed with retentate produced within oxygen transport membrane 28.

As illustrated, fuel is introduced into boiler 1 in a direction indicated by arrowhead "A" that is counter-current to the flow path of retentate streams 34, 36, and 38. Thus, at the last of the oxygen transport membranes 30, fuel rich combustion conditions are obtained that consume substantially all the permeated oxygen. As the fuel stream passes through the row of oxygen transport membranes 24, 26, 28 and 30, the fuel is successively diluted with combustion products. The combustion of the fuel acts as a reactive purge that acts in such counter-current flow direction "A". Since, the reactive purge has the highest fuel concentration at oxygen transport membrane 30, it is more able to facilitate the separation of oxygen than at oxygen transport membrane 24. However, since the separation driving forces (excluding the reactive purge) are greater at oxygen transport membrane 24 than oxygen transport membrane 30, less facilitation is required.

The resultant flue gas produced by combustion of the fuel can either be discharged from combustion zone 31 without further use or can be employed in a superheat exchanger to form superheated steam.

It is contemplated that air stream 32 (as well as the incoming air feeds to the other specifically described embodiments of the present invention) is not compressed by an external compressor. Although not illustrated, a blower or an induced draft fan would be used to overcome flow losses and thereby circulate the air or other oxygen-containing gases to the oxygen transport membranes. Embodiments of the present invention are, however, possible in which the incoming feed is compressed. As is known to those skilled in the art the degree of compression will depend on the degree of oxygen separation required and the additional oxygen separation driving forces provided by the reactive purge or in other embodiments, the sweep gases used.

Figure 2:
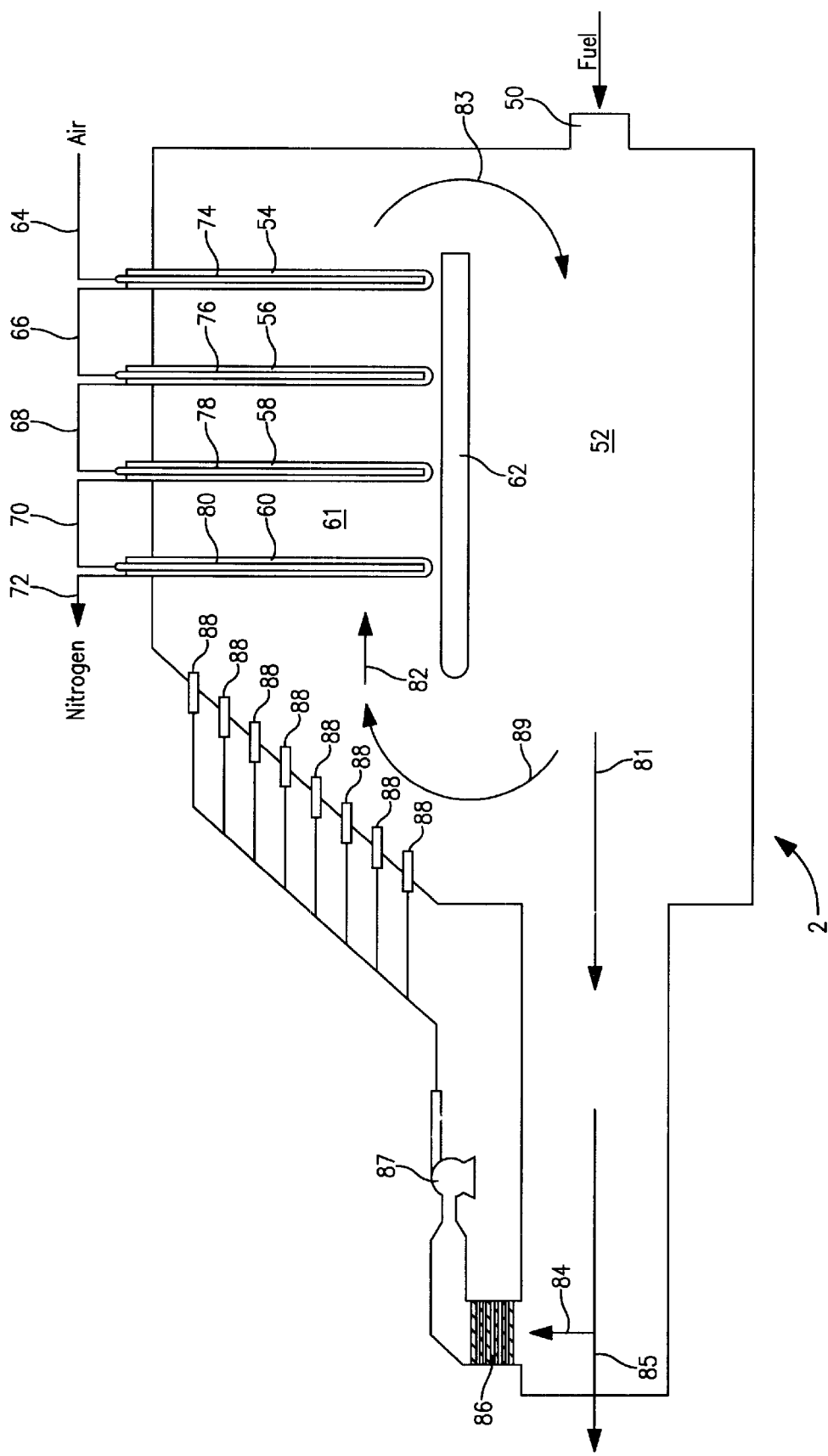
FIG. 2 is a furnace employing a combustion method and system in accordance with the present invention.

With reference to FIG. 2, a furnace 2 is illustrated in which fuel is injected via a nozzle 50 into a combustion zone 52 to be combusted and thereby produce heat for heating a heat load such as a melt. The combustion of the fuel is supported by oxygen produced by oxygen transport membranes 54, 56, 58 and 60 that project into a separation zone 61 separated from combustion zone 52 by means of a baffle plate 62.

Oxygen transport membranes 54, 56, 58, and 60 function in a similar manner to oxygen transport membranes 24, 26, 28 and 30 of boiler 1. In this regard, oxygen transport membranes 54, 56, 58 and 60 are connected in series and are fed by an air stream 64 to produce retentate streams 66, 68, 70, and 72 having an ever decreasing oxygen concentration. Retentate stream 72 can be taken as a nitrogen product stream. The series connection between oxygen transport membranes 54, 56, 58, and 60 is effectuated by lance tubes 74, 76, 78, and 80. Lance tube 74 receives compressed air stream 64, lance tube 76 receives retentate stream 66, lance tube 78 receives retentate stream 68, and lance tube 80 receives retentate stream 70.

As a result of the combustion of the fuel within combustion zone 52, a heated flue gas stream 81 is provided. Part of the heated flue gas stream 81 is used to form a sweep gas stream 82 that is circulated into separation zone 61 in a countercurrent flow direction to the flow of compressed air stream 64 and retentate streams 66, 68, 70, and 72 within oxygen transport membranes 54, 56, 58 and 60. As sweep gas stream 82 travels in the counter-current flow direction, it gains more oxygen and is circulated back to combustion zone 52 as an oxygen-enriched flue gas stream 83 to support the combustion.

As stated above, since oxygen transport membranes 54, 56, 58 and 60 are connected in series, the oxygen content within retentate streams 66, 68 and 70 steadily decreases as does the amount of oxygen permeated through successive oxygen transport membranes. For instance, less oxygen permeates through oxygen transport membrane 58 than oxygen transport membrane 56. As sweep gas stream 82 encounters a last oxygen transport membrane 60 within the row, it has the least concentration of oxygen to most facilitate the permeation of oxygen through oxygen transport membrane 60. As sweep gas stream 82 flows towards oxygen transport membrane 54 (the first in the row), it gathers more oxygen and is therefore less able to facilitate the permeation of oxygen. However, since the oxygen concentration of the feed to oxygen transport membrane 54 is greater than at successive oxygen transport membranes, less facilitation is required.

The circulation of sweep gas stream 82 may be accomplished by means of the motive force of the fuel stream, and the propagation of combustion taking place in combustion zone 52 in the flow direction of air stream 64 and retentate streams 66, 68, 70 and 72. Furnace 2 utilizes more elaborate means. In furnace 2, the circulation is aided by dividing heated flue gas stream 81 into remaining parts 84 and 85. Remaining part 85 can be discharged. Remaining part 84 is further cooled in a heat exchanger 86 to a temperature low enough for effective use of a blower, yet above the water dew point in remaining part 85. Heat exchanger 86 contains a tube bundle oriented in a cross-flow direction and filled with circulating heat transfer media, for instance, water, steam or air. The resultant cooled flue gas stream produced from remaining part 84 is introduced into a blower 87 that is connected to flue gas nozzles 88 to inject flue gas jets in the countercurrent direction into the row of oxygen transport membranes 54, 56, 58 and 60. The flue gas jets create more sweep gas and help circulation of sweep gas stream 82 within furnace 2. As may be appreciated, although eight flue gas nozzles 88 are shown, in a possible embodiment of the present invention only a single flue gas nozzle and therefore a single flue gas jet might be required for the particular circulation requirements.

Oxygen transport membranes 54, 56, 58 and 60 are heated to operational temperature by sweep gas stream 82. In practice, sweep gas stream 82 being formed from a portion 89 of heated flue gas stream 81 is potentially at a temperature that is well in excess of the operational temperature of oxygen transport membranes 54, 56, 58 and 60. Sweep gas stream 82 is, however, sufficiently cooled by entrainment in flue gas jets that are formed from remaining part 84 of heated flue gas stream 81 that has been cooled within heat exchanger 86.

The furnace exit gas temperature and the desired operating temperature of the oxygen transport membranes 54, 56, 58 and 60 define the optimal ratio of the cooled flue gas to hot flue gas, namely, the ratio between remaining part 84 and portion 89 of heated flue gas stream 81. The calculations to determine this are based on a simple mass and energy balance. For example, assuming remaining part 84 of heated flue gas stream 81 has been cooled to about 400° F., an operational temperature of oxygen transport membranes 54, 56, 58 and 60 of about 1800° F., for a furnace exit gas temperature of about 2100° F., about 20% of sweep gas stream 82 should be made up of remaining part 84 of heated flue gas stream 81, after having been cooled.

As may be appreciated, part or all of the make-up for the jets emanating from flue gas nozzles 88 could be steam.

With additional reference to FIG. 3, a boiler 3 is illustrated in which a fuel stream is introduced into a combustion zone 90 by way of a fuel nozzle 92. Combustion of the fuel stream produces heat that is used to boil water or superheat steam within steam tubes 94.

A flue gas stream 96 produced by the combustion is separated so that a part 97 thereof is introduced into a separation zone 98 as a sweep gas. A remaining part of flue gas stream 96 is discharged as a stream 99. Separation zone 98 contains a row of oxygen transport membranes 100, 101, 102, 104, 106, 108 and 110 that are connected in series by lance tubes and function in a similar manner to oxygen transport membranes 54, 56, 58, and 60 shown in the embodiment of furnace 2. Part 97 of flue gas stream 96 acts as a sweep gas passing in the counter-current flow direction to the compressed air and retentate streams to facilitate the separation of oxygen in the same manner described with reference to furnace 2.

The sweep gas after having passed through separation zone 98 becomes oxygen enriched to form an oxygen-enriched sweep gas stream 112. Oxygen-enriched sweep gas stream 112 is circulated back to combustion zone 90 to support combustion of the fuel by means that include a heat exchanger 114 that acts to cool oxygen-enriched sweep gas stream 112 and form a cooled sweep gas stream 116. Such means also include a blower 118 that is connected between heat exchanger 114 and an inlet 119 of combustion zone 90 to supply the motive force for such circulation.

It is to be noted that in any embodiment of the present invention where circulation is required, such circulation can be effected by more direct means such as a high temperature blower. Furthermore, although oxygen transport membranes 54, 56, 58 and 60 for furnace 2 and oxygen transport membranes 100, 101, 102, 104, 106, 108 and 110 are heated to operational temperature by the respective sweep gas streams, other embodiments are possible. For instance, the air or other oxygen containing feed to the oxygen transport membranes could be heated by such means as the combustion of fuel in the feed. Separate heaters could also be used. In such cases, all of the sweep gas might be sufficiently cooled to be circulated by a blower alone. Although the circulation is illustrated as being in cross flow, embodiments of the present invention are possible in which the oxygen transport membranes are oriented parallel to the flow of sweep gas (at right angles to the illustrated orientation.) For instance, the oxygen transport membranes might be in an annular arrangement surrounding a central combustion zone producing heated flue gas that would in part be circulated from the central combustion zone to the oxygen transport membranes.

As may be appreciated, although a single row of oxygen transport membranes is illustrated for each of the embodiments shown in FIGS. 1–3 (for instance, oxygen transport membranes 24, 26, 28 and 30 of boiler 1), embodiments of the present invention are possible that employ multiple rows of oxygen transport membranes receiving compressed air from an inlet manifold and discharging an oxygen lean or a nitrogen product to a discharge manifold. If more than one row of oxygen transport membranes were used, adjacent sets of oxygen transport membranes, as viewed transversely to the rows of oxygen transport membranes, would be manifolded together so that each adjacent set of oxygen transport membranes would produce retentate streams having like oxygen concentrations that would be combined and passed to a successive adjacent set of oxygen transport membranes. In any embodiment of the present invention, including those in which the oxygen transport membranes are not connected in series, the rows of oxygen transport membranes can be staggered so that each oxygen transport membrane has the full benefit of the cross-flow action of the reactive purge or sweep gas. Additionally, although the oxygen transport membranes are illustrated as closed-end tubes, other forms of oxygen transport membranes are possible such as plates.

Other applications of the present invention are possible beyond those illustrated in the embodiments shown in FIGS. 1–3. For instance, a reactor to produce a nitrogen-enriched product stream might have a similar schematic representation to boiler 1. In such case although such reactor might be provided with steam tubes 12, 14, 16, and 18, other tubes containing any suitable heat transfer fluid might be employed. Similarly, a reactor having a similar design to that shown in FIG. 2 could be used for the sole purpose of producing a nitrogen-enriched product stream. In such applications of the present invention, the incoming air feed might be compressed if the product were desired at pressure.

Although not illustrated, embodiments of the present invention are possible in which the oxygen transport membranes are not connected in series, but enjoy the benefits of a cross-flow reactive purge or sweep gas. Further, although the present invention has been illustrated in connection with one or more rows of oxygen transport membranes, an embodiment employing a single oxygen transport membrane is possible.

As stated above, temperature control of the oxygen transport membranes is critical, particularly in the case, such as illustrated in FIG. 1 in which a reactive purge is produced by the combustion of fuel at the surface of an oxygen transport membrane. In this regard, the present invention, in addition to any method or device that utilizes a cooled sweep gas for temperature control (such has been discussed with reference to the embodiment shown in FIG. 2) also encompasses any method or device in which a reactive purge is utilized. As such, the present invention is intended to cover a single or multiple oxygen transport membranes subjected to a reactive purge in which temperature is controlled with an appropriate heat sink. Such aspect of the present invention is therefore not limited to the use of a counter-current reactive purge. Further, the heat sink can be flowing heat transfer fluid, water in case of a boiler, or a melt and refractory lining within a furnace in case of a furnace.

In any configuration of oxygen transport membranes, involving a reactive purge, the combustion of fuel will take place on or at least near the surface of a membrane. For instance, in case of a single membrane, fuel will combust at the leading surface of the membrane. As the fuel flow travels around the membrane, it mixes with combustion products and is diluted. The dilution of the fuel decreases the driving force for the diffusion of the fuel to the surface of the membrane and hence, produces combustion of the fuel at or near the surface of the membrane. The same holds true for dilution of the fuel as it passes to successive membranes in a row of membranes.

Figure 4:
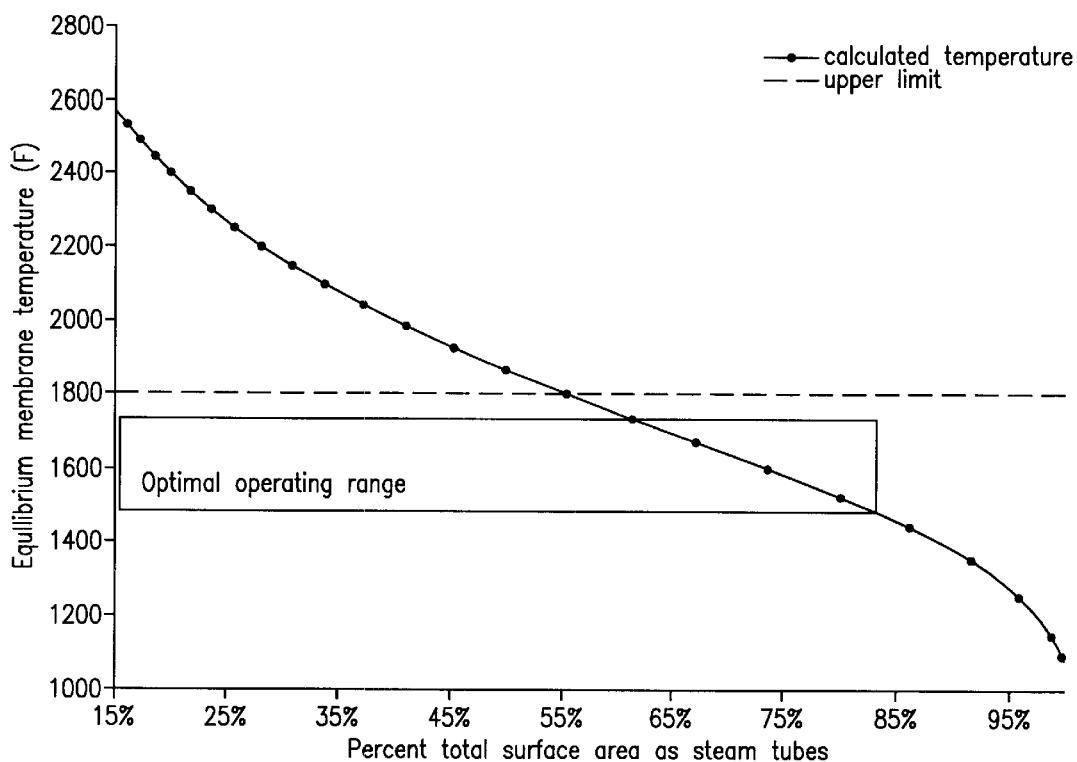
FIG. 4 is a graphical illustration of an example of permissible surface area ratios of oxygen transport membranes and steam tubes to control membrane temperature within a boiler.

Under conditions of combustion encountered in the present invention, namely, combustion at or near the surface of the membrane, heat transfer by the mechanism of radiation will dominate. Therefore, a heat sink employed in connection with such an oxygen transport membrane must be designed and employed to sufficiently absorb the radiant heat that thermal runaway is prevented. With reference to FIG. 4, a calculated example is shown of an oxygen transport membrane of tubular form surrounded by six steam tubes. For purposes of the example, the oxygen transport membrane was assumed to have an oxygen flux of 20 scfh/ft$^2$ throughout the optimum operating range. In this example it was assumed that both the steam tubes and the oxygen transport membrane acted as black bodies with the field of view between the oxygen transport membranes and the surrounding steam tubes estimated by the crossed string method. The combustion flux for the membrane was set at 9000 BTU/ft$^2$ and the steam tube temperature was fixed at 400° F. The upper limit of the operating range of the membrane is that temperature at which the membrane will fail. The lower limit is the temperature at which the membrane will cease to function. As illustrated, the steam tubes must constitute at least about 58% of the total surface area of the membrane and the steam tubes to prevent the membrane from overheating. At the other extreme, a ratio of greater than about 85% leads to excessive cooling of the membranes.

Figure 5:
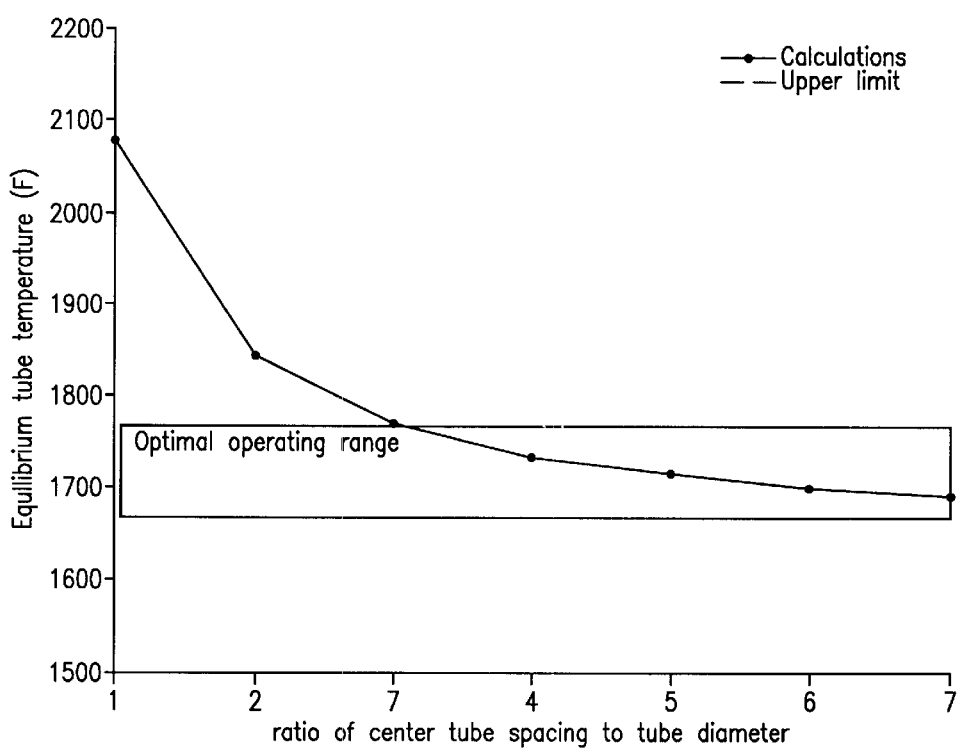
FIG. 5 is a graphical illustration of an example of permissible oxygen transport membrane spacing to control membrane temperature within a glass furnace.

With reference to FIG. 5, an example of an oxygen transport membrane located within a glass furnace is illustrated. In case of a refractory lined roof of a glass furnace, the oxygen transport membranes will be positioned immediately adjacent to the roof. The oxygen transport membranes will "see" for purposes of radiative heat transfer a planar heat sink which would be the glass bath. The roof can be assumed to be in radiative equilibrium with such planar heat sink. Assuming such an arrangement, and, again, assuming tubular oxygen transport membranes with all surfaces acting as black bodies, the equilibrium surface temperature of the oxygen transport membranes can be calculated for a given center to center spacing of the membranes. For purposes of the example, the heat sink was assumed to be at 1200° F. and the combustion flux was again set at 9000 BTU/hour. In this example, it can be seen that the ratio of center to center tube spacing to tube diameter must be greater than about 3 to avoid excessive temperatures.

Although the present invention has been described with reference to preferred embodiments as will occur to those skilled in the art, numerous changes, additions and omissions may be made without departing from the spirit and the scope of the present invention.

We claim:

1. A method of combusting a fuel comprising:
   introducing an oxygen-containing stream into at least one oxygen transport membrane projecting into a combustion zone to separate oxygen from the oxygen-containing stream and thereby, to introduce an oxygen permeate into the combustion zone;
   introducing a fuel stream into the combustion zone;
   combusting fuel within said fuel stream in the presence of said oxygen permeate so that said at least one oxygen transport membrane is subjected to a reactive purge and a portion of heat arising from the combustion of the fuel heats said at least one oxygen transport membrane to an operational temperature; and
   absorbing radiant heat energy emanating from said at least one oxygen transport membrane within a heat sink to promote stabilization of the operational temperature thereof.

2. The method of claim 1, wherein:
   said at least one oxygen transport membrane comprises at least one row of oxygen transport membranes spaced apart from one another; and
   said fuel stream is introduced in a cross-flow relationship to said at least one row of oxygen transport membranes.

3. The method of claim 2, wherein said heat sink comprises tubes of flowing heat absorbing fluid interspersed within said at least one row of oxygen transport membranes.

4. The method of claim 3, wherein said tubes of flowing heat absorbing fluid are steam tubes to heat water flowing therein.

5. The method of claim 3 or claim 4, further comprising:
   connecting said at least one row of oxygen transport membranes in series to produce a flow path of retentate streams passing to successive oxygen transport membranes having ever more lean oxygen concentrations; and
   introducing the fuel stream into said combustion zone in a counter-current flow direction as viewed with respect to the flow path of the retentate streams so that said reactive purge acts in said counter-current flow direction.

6. A method of combusting fuel comprising:

introducing an oxygen-containing stream into at least one oxygen transport membrane projecting into a separation zone to separate oxygen from said oxygen-containing stream and thereby, to introduce an oxygen permeate into said separation zone;

heating the at least one oxygen transport membrane to an operational temperature;

introducing a fuel stream into a combustion zone to combust and thereby to produce a flue gas stream;

circulating a sweep gas stream, composed of part of said flue gas stream, within the separation zone; and circulating said sweep gas stream from said separation zone to said combustion zone to support combustion of said fuel stream.

7. The method of claim 6, wherein:

said at least one oxygen transport membrane comprises at least one row of oxygen transport membranes spaced apart from one another; and said sweep gas stream is introduced in a cross-flow relationship to said at least one row of oxygen transport membranes.

8. The method of claim 7, wherein:

the oxygen transport membranes are connected in series to produce a flow path of retentate streams passing to successive oxygen transport membranes and having ever more lean oxygen concentrations; and the sweep gas stream is circulated in a counter-current flow direction as viewed with respect to the flow path of the retentate streams.

9. The method of claim 7 or claim 8, wherein said oxygen transport membranes are heated to said operational temperature by said sweep gas stream.

10. The method of claim 9, wherein said sweep gas stream is circulated by cooling a remaining part of said flue gas stream and injecting said remaining part of said flue gas stream into said separation zone in the form of at least one jet.

11. The method of claim 9, wherein said sweep gas stream is circulated by cooling said sweep gas stream after passage through said separation zone and injecting said sweep gas stream into said combustion zone by a blower.

12. The method of claim 1 or claim 6, wherein:

said oxygen-enriched stream is air;

separation of the oxygen from the oxygen-enriched stream produces a nitrogen-enriched stream; and said nitrogen enriched stream is extracted as a product stream.

13. An oxygen enhanced combustion system comprising:

at least one oxygen transport membrane located within a combustion zone to separate said oxygen from an oxygen-containing stream introduced into said at least one oxygen transport membrane, thereby to produce an oxygen permeate;

at least one fuel nozzle for injecting a fuel stream of the fuel into said combustion zone so that said at least one oxygen transport membrane is subjected to a reactive purge produced by combustion of the fuel in the presence of said oxygen permeate and a portion of heat arising from the combustion of the fuel heats said at least one oxygen transport membrane to an operational temperature; and a heat sink positioned to absorb radiant heat energy emanating from said at least one oxygen transport membrane to promote stabilization of the operational temperature thereof.

14. The system of claim 13, wherein:

said at least one oxygen transport membrane comprises at least one row of oxygen transport membranes spaced apart from one another; and said heat sink comprises tubes of flowing heat absorbing fluid interspersed within said at least one row of oxygen transport membranes.

15. The system of claim 14, wherein said tubes of flowing heat absorbing fluid are steam tubes to heat water flowing therein.

16. The system of claim 14 or claim 15, further comprising:

said at least one row of oxygen transport membranes connected in series to produce a flow path of retentate streams passing to successive oxygen transport membranes having ever more lean oxygen concentrations; and said at least one fuel nozzle is positioned to introduce the fuel stream into said combustion zone in a counter-current flow direction as viewed with respect to the flow path of the retentate streams so that said reactive purge acts in said counter-current flow direction.

17. An oxygen enhanced combustion system comprising:

at least one oxygen transport membrane located within a separation zone to separate said oxygen from an oxygen-containing stream introduced into said at least one oxygen transport membrane;

at least one nozzle for injecting a fuel stream into a combustion zone for combustion of said fuel to produce a flue gas stream;

means for heating said at least one oxygen transport membrane; and means for circulating a sweep gas stream composed of a part of said flue gas stream into said separation zone and from said separation zone to said combustion zone to support combustion of said fuel stream.

18. The system of claim 17, wherein:

said at least one oxygen transport membrane comprises at least one row of oxygen transport membranes spaced apart from one another; and said sweep gas stream circulating means circulate said sweep gas stream in a cross-flow relationship to said at least one row of oxygen transport membranes.

19. The system of claim 18, wherein:

said oxygen transport membranes are connected in series to produce a flow path of retentate streams passing to successive oxygen transport membranes and having ever more lean oxygen concentrations; and the sweep gas stream is circulated in a counter-current flow direction as viewed with respect to the flow path of the retentate streams.

20. The system of claim 18 or claim 19, wherein said heating means comprises heat transfer from said sweep gas stream.

21. The system of claim 20 wherein said sweep gas stream circulating means comprise:

a heat exchanger to cool a remaining part of said flue gas stream;

at least one flue gas nozzle to inject at least one flue gas jet composed of said flue gas stream; and a blower interposed between said heat exchanger and said at least one flue gas nozzle.

22. The system of claim 20, wherein said sweep gas stream circulating means comprise:

a heat exchanger to cool the sweep gas stream, the heat exchanger positioned to receive said sweep gas stream after having passed through said separation zone;

an inlet to said combustion zone; and a blower interposed between said heat exchanger and said inlet to inject said sweep gas stream into said combustion zone.

* * * * *